United States Patent
Ray

[15] 3,666,173
[45] May 30, 1972

[54] PILOT REGULATOR OPERATED MAIN VALVE

[72] Inventor: William A. Ray, North Hollywood, Calif.

[73] Assignee: International Telephone and Telegraph Corporation, New York, N.Y.

[22] Filed: May 21, 1970

[21] Appl. No.: 39,282

[52] U.S. Cl............................236/15 A, 236/68 R, 251/46
[51] Int. Cl.........................................................F23n 1/00
[58] Field of Search..............236/15 A, 68, 87, 80; 251/11, 251/33, 46; 137/495

[56] References Cited

UNITED STATES PATENTS

| 3,402,889 | 3/1971 | Willson | 236/80 |
| 3,261,549 | 7/1966 | Ray | 236/80 |
| 3,227,370 | 1/1966 | Houser | 236/80 X |

*Primary Examiner*—William E. Wayner
*Attorney*—C. Cornell Remsen, Jr., Walter J. Baum, Paul W. Hemminger, Charles L. Johnson, Jr. and Thomas E. Kristofferson

[57] ABSTRACT

A control for a gas heater or the like including a regulator for the pilot burner gas supply, and a control valve connecting the regulator output to a main line gas shutoff valve. The main line valve is a diaphragm valve.

3 Claims, 1 Drawing Figure

PATENTED MAY 30 1972
3,666,173
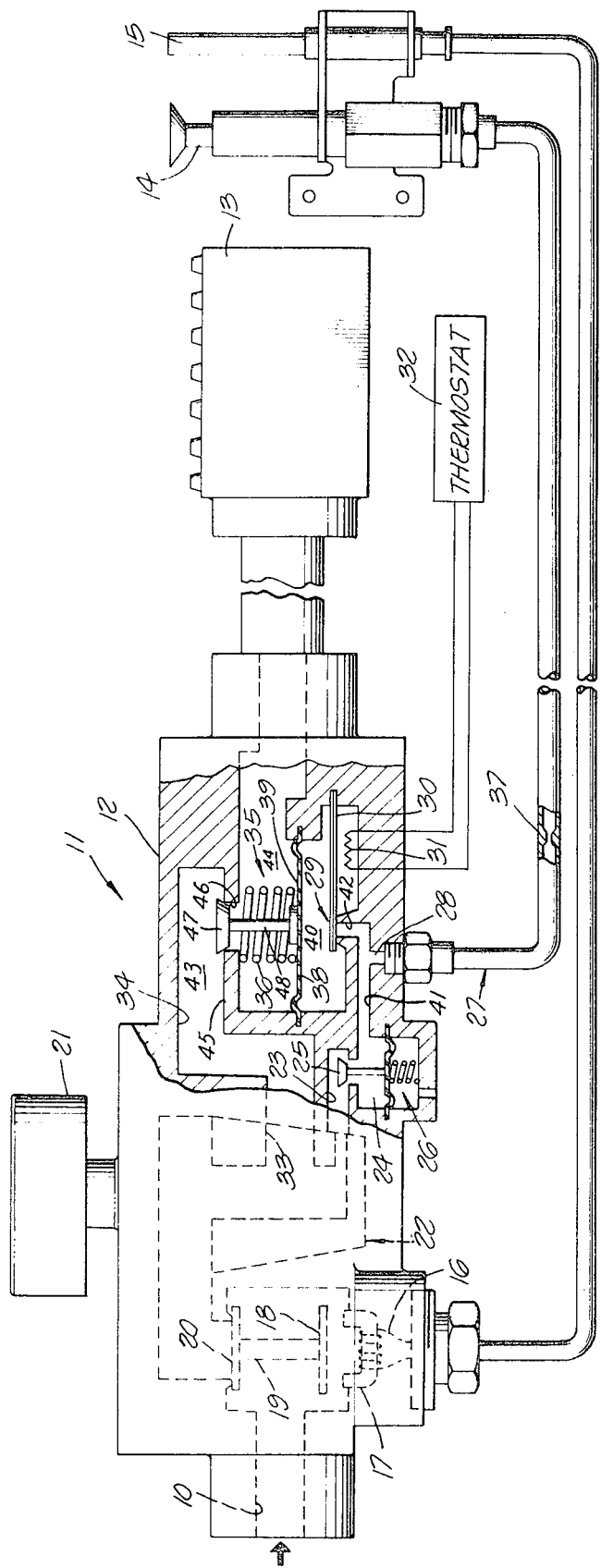
INVENTOR
WILLIAM A. RAY
BY
*A. Donald Stopp*
ATTORNEY

PILOT REGULATOR OPERATED MAIN VALVE

BACKGROUND OF THE INVENTION

This invention relates to pressure regulated pilots for fluid fuel combustion apparatus, and more particularly to a pilot regulator for controlling a main line shutoff valve.

Although regulation of the gas flow for both pilots and main burners has been more or less common over the years, said operation has either required the use of both a tight and safe operating main line regulator which would still be capable of handling the limited pilot flow when the equipment is off, or the use of independent pilot flow and main line flow regulators.

Either solution has been expensive or resulted in control components which are larger in size or require more pressure loss through additional valving, which are almost unacceptable in today's high building cost market.

SUMMARY OF THE INVENTION

In accordance with the device of the present invention, the above-described and other disadvantages of the prior art are overcome by providing a pilot regulator for controlling a main line shutoff valve.

Thus, the regulator may be small or pilot sized. It may be placed in the pilot flow line as brought off from the gas cock on the typical combination gas valve. A main line shutoff valve comprising a diaphragm valve may be controlled by tapping off a line on the discharge side of this regulator, connecting a control valve in said line, and then connecting same to the far side of the main valve diaphragm. Said diaphragm is so arranged that it pushes the main valve open on application of pressure to the far side of the diaphragm. A small bleed orifice is included in the diaphragm. The pilot line regulator outlined in the above may be sized, if desired, to provide a uniform gas pressure somewhere between 100 percent to 200 percent of normal pilot consumption. Said pilot regulator pressure should be set slightly above the desired main valve pressure by the amount of the main valve differential head loss including any servo-operating pressure head requirements. The control valve can also be small and of the order of 0.045 inch to 0.075 inch clear port diameter.

The small regulator can thus economically regulate both pilot and main line flows. Further, thermostat control of the control valve can turn on or completely shut off the diaphragm valve.

The above-described and other advantages of the invention will be better understood from the following description when considered in connection with the accompanying drawing.

BRIEF DESCRIPTION OF THE DRAWING

In the drawing, which is to be regarded as merely illustrative, the figure is a side elevational view partly in section of a control for a gas heater constructed in accordance with the present invention.

DESCRIPTION OF THE PREFERRED EMBODIMENT

In the drawing, a gas inlet is indicated at 10. Those portions of the apparatus shown in elevation may be entirely conventional.

The control of the invention is indicated at 11 including valve body 12. Control 11 is constructed to supply gas to a main burner 13 and a pilot burner 14. The pilot light from burner 14 heats a thermocouple 15 which supplies electric current to a winding 16. Winding 16 is wound around a ferromagnetic body 17 which attracts a ferromagnetic body 18 fixed to a valve shaft 19. A valve 20 is fixed to shaft 19. Thermocouple 15 cannot supply sufficient power to body 18 to be attracted to body 17. However, if body 18 is placed against body 17, and the pilot light is lit for a sufficient amount of time to heat thermocouple 15, the current passing through winding 16 will then cause body 17 to attract body 18 and prevents upward movement of shaft 19. Valve 20 is spring biased closed by a spring, not shown, in the conventional manner. Shaft 19 is moved downwardly by a control knob 21 in a conventional manner, not shown.

Knob 21 also can turn a gas cock 22 to allow gas to enter a chamber 23 when knob 21 is in the pilot position and valve 20 is open. Gas entering chamber 23 may then be allowed to pass into a chamber 24 by a conventional regulator valve 25 of a regulator 26. Regulator 26 is likewise conventional.

The output of regulator 26 is admitted to a conduit 27 through a passage 28 and to a bimetal valve 29. Bimetal valve 29 has a bimetal strip 30 and an electric heater 31. Heater 31 is connected to a source of potential, not shown, through a thermostat switch 32. Main burner 13 receives gas through a main port 33 in gas cock 22 which aligns with a chamber 34 in valve 12. Gas in chamber 34 passes through a conventional diaphragm valve 35 to main burner 13. The construction of control 11 not shown in section may be identical to that shown in U.S. Pat. No. 3,303,866.

OPERATION

In the operation of the invention shown in the drawing, when knob 21 is in the off position, valve 20 is closed. The closure of valve 20 shuts off gas supplied to both chambers 23 and 24. When knob 21 is turned to the pilot position and pushed down, valve 20 presses against body 17. In this case, gas is supplied to pilot burner 14. The pilot burner is then lit and heats thermocouple 15. Thermocouple 15 supplies current to winding 16 and bodies 17 and 18 and will stick together and hold valve 20 open. Bodies 17 and 18 will stay together due to the force of magnetic attraction produced by the current flowing in winding 16. Regulator 26 then supplies regulated gas to pilot burner 14. Knob 21 is then turned to allow gas to be admitted to chamber 34. Main burner 13 still does not receive gas until diaphragm valve 35 opens. Diaphragm valve 35 will not open until bimetal valve 29 opens. Bimetal valve 29 is opened when strip 30 is heated by heater 31. Heater 31 is supplied with electric current to heat it when thermostat switch 33 is actuated. When bimetal valve 29 opens, the diaphragm valve 35 receives regulated gas from regulator 26 and passes a regulated gas from chamber 34 to main burner 13. Regulator valve 35 may be biased closed by a spring 36. Conduit 27 may have a restriction 37 therein, if desired. However, restriction 38 is not absolutely necessary for the practice of the invention. Diaphragm valve 35 includes a diaphragm 38 having a small hole 39 therethrough. Hole 39 enables valve 35 to close when valve 29 is closed.

Restriction 37 is employed to create back pressure. Actually, there must be some way of creating a back pressure in conduit 27. Otherwise, the pilot gas regulator valve 25 and/or 26 could not perform its function. On the average job, this back pressure would come from the orifice in the pilot burner and a restriction such as 37 would not be necessary. If what is known as a raw gas type pilot burner is used, i.e., one that does not inspirate its own combustion air, then a restriction somewhere in conduit 27 or at the pilot burner would be necessary. This, however, is a rarity.

Note also in the operation and in the drawings that a bimetal 30 operated pilot line for the main diaphragm control valve is disclosed. Actually, one could use a magnetic valve, a self-generating system pilot valve, a thermostatic valve or many other types. In fact, anything that would constitute a sensing and/or valving and/or switching device would be satisfactory.

DEFINITIONS

Valve body 12 may be considered a housing having a hole 42 providing communication between an outlet 41 of pressure regulator 26 and a chamber 40 defined between diaphragm 38 and valve body 12 below diaphragm 38.

Thus, valve 29 opens and closes hole 42. Valve body 12 has a web 45 between an inlet 43 and an outlet 44 of diaphragm valve 35. Web 45 has an opening 46 therethrough. Diaphragm valve 35 includes a valve part 47 which opens and closes the inlet side of opening 46.

A shaft 48, which acts as a valve stem, is spaced from and located centrally within opening 46. Shaft 48, thus, extends through opening 46.

Valve parts 47 and diaphragm 38 are fixed to opposite ends of shaft 48.

Spring 36 is an opened coiled compression spring which surrounds shaft 48 between web 45 and diaphragm 38. Spring 36 is adapted to close valve part 47 when the pressure in chamber 40 and in the diaphragm valve outlet 44 are equalized.

What is claimed is:

1. In combustion apparatus, the combination comprising: a housing having a passage therethrough; a first valve mounted in said passage actuable to permit, selectively, the flow of a combustible gas through said passage, said passage having an inlet on one side of said first valve and first and second outlets on the other side thereof; a second valve having an inlet connected from said first outlet; a main burner; said second valve having an outlet connected to said main burner; a pressure regulator having an inlet connected from said second outlet; a pilot burner, said pressure regulator having an outlet connected to said pilot burner, said second valve being a diaphragm valve, the diaphragm of said second valve being sealed with said housing to form a chamber on one side thereof opposite that on which said second valve outlet is positioned; a third electrically actuable valve connected from said regulator outlet to said chamber; a thermostat located in the space to be heated by said main burner, said thermostat being connected to said third valve to actuate the same; and means to provide a flow restriction between said chamber and said second valve outlet.

2. The invention as defined in claim 1, wherein said means is a hole through said diaphragm.

3. The invention as defined in claim 2, wherein said housing has a hole providing communication between the outlet of said regulator and said chamber, said third valve being actuable to close said hole, said housing having a web between the inlet and outlet of said second valve, said web having an opening therethrough, a valve part to close the inlet side of said opening, a shaft spaced from said opening and extending therethrough, said valve part and said diaphragm being fixed to the opposite ends of said shaft, respectively, and an open coiled compression spring surrounding said shaft between said web and said diaphragm adapted to close said valve part when the pressure in said chamber and said second valve outlet are equalized.

* * * * *